Aug. 22, 1961    H. L. BOWDITCH    2,997,637
POSITIONING MOTOR
Filed May 26, 1958    2 Sheets-Sheet 1
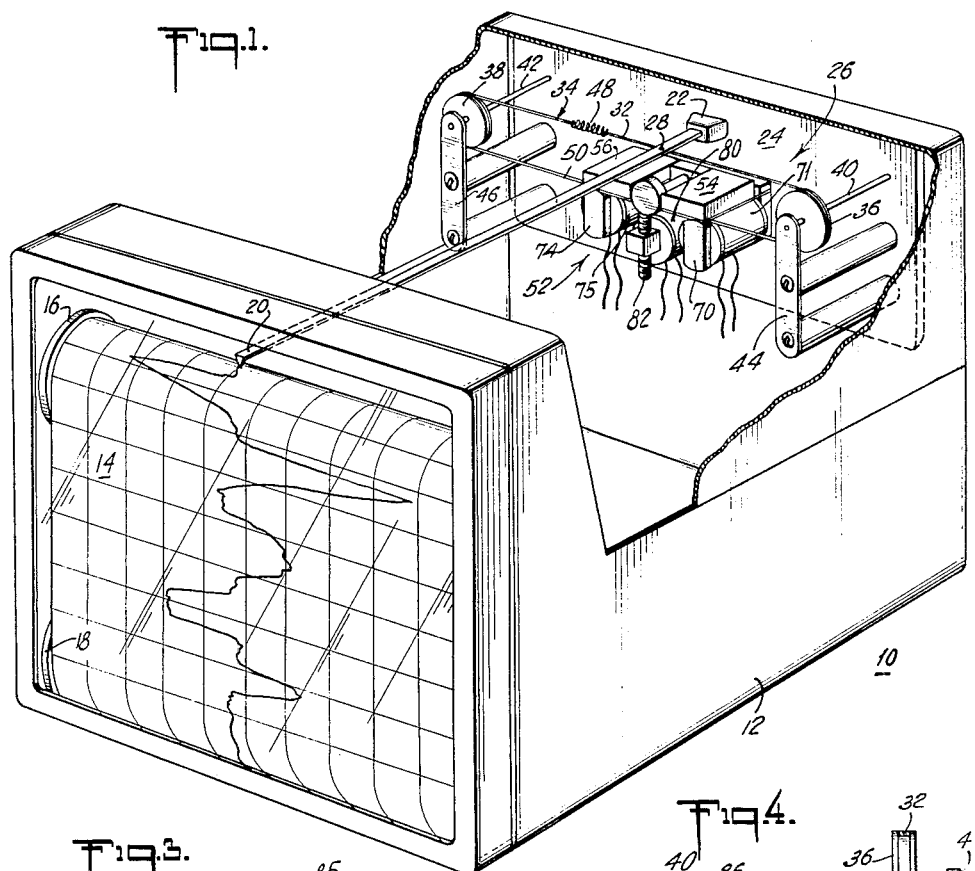
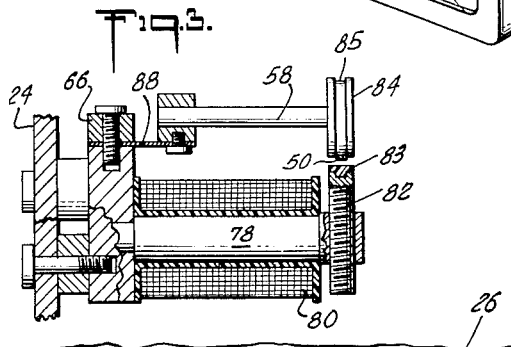
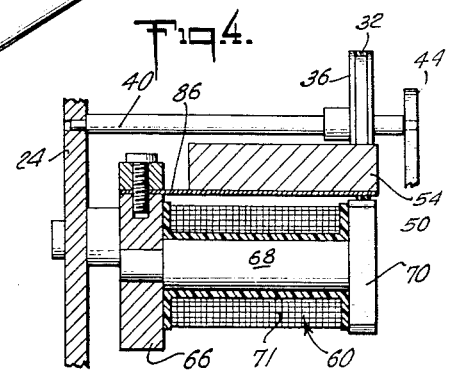
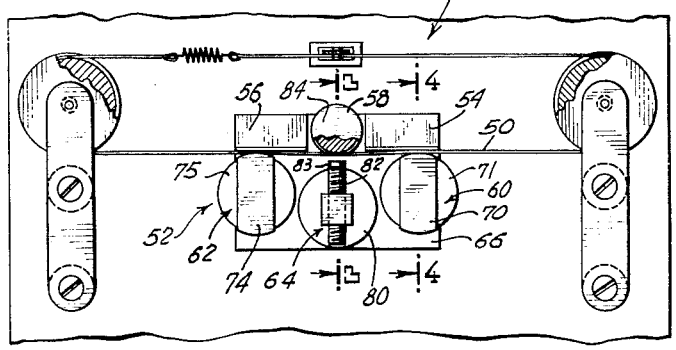
INVENTOR
HOEL L. BOWDITCH
BY
Curtis, Morris & Safford
ATTORNEYS Aug. 22, 1961 H. L. BOWDITCH 2,997,637
POSITIONING MOTOR
Filed May 26, 1958 2 Sheets-Sheet 2
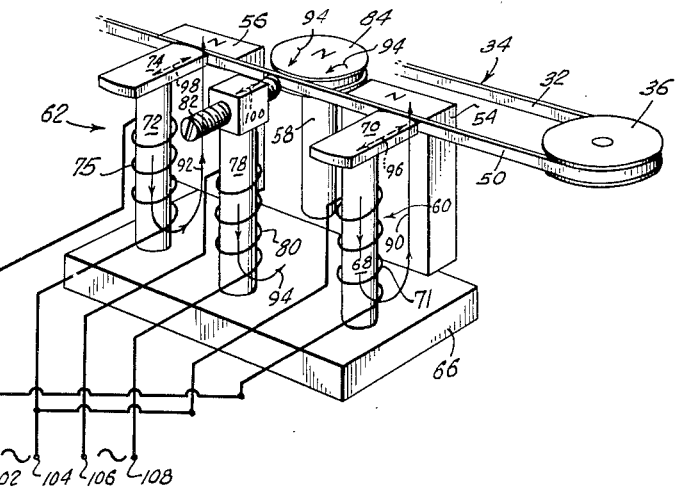
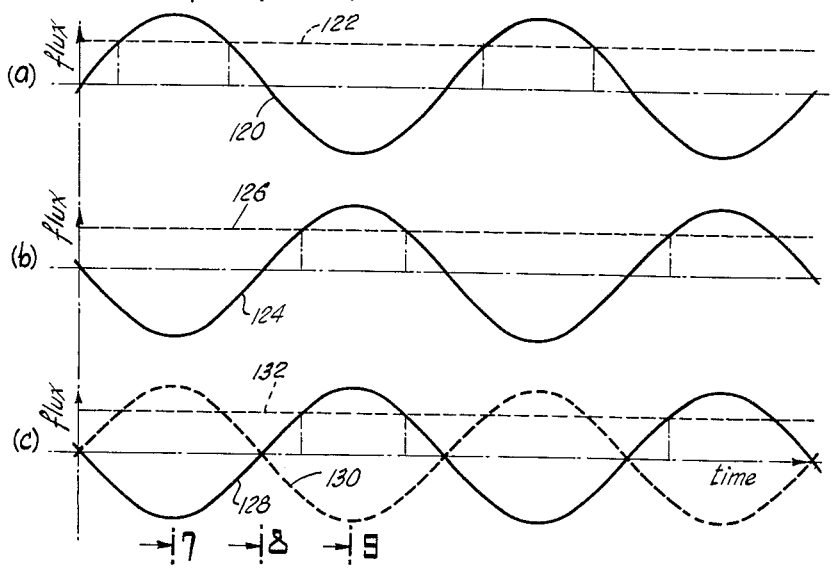
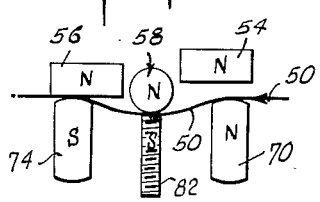 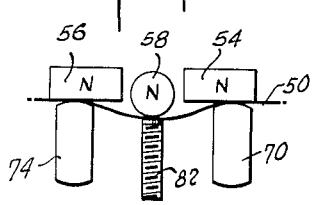 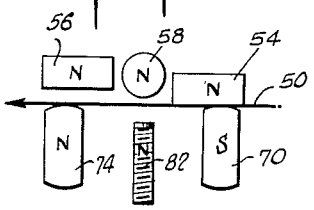
INVENTOR
HOEL L. BOWDITCH
BY
Curtis, Morris & Safford
ATTORNEYS United States Patent Office 2,997,637
Patented Aug. 22, 1961

2,997,637
POSITIONING MOTOR
Hoel L. Bowditch, Foxboro, Mass., assignor to The Foxboro Company, Foxboro, Mass., a corporation of Massachusetts
Filed May 26, 1958, Ser. No. 737,664
4 Claims. (Cl. 318—37)

This invention relates to an electric motor for positioning such elements as the pen of a recording instrument, the re-balancing member of an automatic measuring circuit, and so forth.

An object of the invention is to provide an electric positioning motor which is simple and inexpensive to manufacture, does not require critical tolerances, but which is very precise and reliable in operation.

Another object is to provide such a motor which can be controlled by relatively small amounts of power and which responds to control signals quickly and without overshoot.

These and other objects will in part be understood from and in part pointed out in the description given hereinafter.

Modern industry uses a wide variety of apparatus to automatically control and record such conditions as temperature, pressure, rate-of-flow, and the like. In such apparatus, the mechanical re-balancing of a condition sensing element, the closing or opening of a valve, or the movement of a pen across a recording chart are all executed by a positioning motor of one kind or another. To meet the high standards of perfection required in this service, a positioning motor must be free of harmful bearing drag or play, and it must respond easily to relatively weak control signals. It must also be able to quickly reach a position which accurately accords with any given control signal, then stop without overshoot or hunting, and thereafter maintain its position until directed to a new one. Finally, because such a motor is in one sense the heart of the instrument or apparatus and is frequently located in cramped or inaccessible places, it must operate unattended for years with absolute reliability, and yet it must be small in size. These requirements have, in the past, been very difficult to fulfill and many motors previously developed have been too expensive or else not sufficiently reliable or precise in operation.

The present invention provides a positioning motor having all the desirable features of simplicity, low cost, reliability and preciseness in operation. In accordance with the invention there is provided a motor which can be energized with standard 60-cycle alternating current and very little power. In the specific motor illustrated herein the movable element, somewhat analogous to the armature in a conventional electric motor, is a thin flexible band stretched around two spaced pulleys to form two parallel sections which are held taut by a spring connecting the ends of the band. Acting on the mid-portion of one section of the band is a clamping and flexing mechanism, energized by simple electromagnets, which by repeatedly bowing a short length of the section serves to "inch" the band along in steps, in either direction as desired, in much the way a caterpillar creeps along the ground. Each step taken by the band is small but the steps are taken 60 to the second so that the band can move at considerable speed. The inertia of the band is essentially negligible and since it inherently comes to a complete stop between each step there is no overshoot on reaching a position. When there is no control signal the band is clamped against movement so that the jarring effects of external vibrations or shocks is minimized. This motor is mechanically easy to construct and its parts are essentially self-aligning.

A better understanding of the invention and a fuller appreciation of its many advantages will best be gained from a study of the following description given in connection with the accompanying drawings wherein:

FIGURE 1 is a perspective view partly broken away of a strip chart recorder using a positioning motor embodying features of the invention;

FIGURE 2 is an enlarged plan view of the motor showing it substantially to scale;

FIGURE 3 is a section view taken as indicated by lines 3—3 in FIGURE 2;

FIGURE 4 is a section view taken as indicated by lines 4—4 in FIGURE 2;

FIGURE 5 is a schematic representation of the motor illustrating the magnetic flux paths;

FIGURES 6(a), (b) and (c) are graphs of the magnetic flux versus time in the clamping and bowing electromagnets of the motor; and FIGURES 7, 8 and 9 indicate the position (in exaggerated scale) of the motor elements at the successive times indicated by lines 7—7, 8—8 and 9—9, respectively, in FIGURE 6.

The chart recorder 10 shown in FIGURE 1 includes a housing 12 having a front window behind which is positioned a chart 14 mounted on two rollers 16 and 18 and driven slowly downward by a clock motor (not shown). In contact with the upper portion of the chart, and adapted to swing in either direction across it, is an indicator pen 20 which records, in accordance with its lateral position on the chart, a variable condition such as temperature. The rear end of this pen carries a counterweight 22 which is closely in front of the base plate 24 of an electric motor generally indicated at 26. Just forward of this counterweight the pen is attached at point 28 to the upper section 32 of a band 34.

The band 34 is a flexible ribbon of metal, and is stretched around and between the two idler pulleys 36 and 38. The latter in turn are rotatably mounted on the axles 40 and 42 which are supported by the brackets 44 and 46 secured to the base plate 24. The band is kept taut by means of a tension spring 48 inserted in the top section 32. As will appear, this band can be driven in either direction and in so moving will carry the indicating pen 20 transversely across the chart 14. The position of the band, and with it the pen, is precisely controlled in the way explained below.

Band 34 has a lower section 50 (see also FIGURE 2) which is engaged on one side by a clamping and flexing mechanism generally indicated at 52. This mechanism includes the two laterally movable clamping bars 54 and 56, which are permanently magnetized and between which is mounted a laterally movable bowing arm 58 formed of soft magnetic material. Positioned on the opposite side of the lower section 50 of the band are three electromagnets 60, 62 and 64 which cooperate with the clamping bars 54 and 56 and the bowing arm 58 respectively.

These electromagnets 60, 62 and 64 are mounted, along with the clamping bars 54, and 56 and the bowing arm 58, on a support plate 66 formed of soft magnetic material, and which in turn is fastened (see also FIGURE 3) to the base plate 24. The right-hand electromagnet 60, seen in FIGURE 4, includes a cylindrical magnetic core 68 the bottom of which is anchored in the support plate 66 and the top of which carries a pole piece 70. Surrounding this core is a multi-turn coil 71 which is adapted to be supplied with alternating current to generate a magnetic flux in the core and pole piece. The other electromagnet 62 similarly includes a magnetic core 72 (see FIGURE 5) fastened at one end to the support plate 66, having a pole-piece 74 at the other end, and surrounded by a coil 75. The center electromagnet seen in FIGURE 3, has a magnetic core 78, and a surrounding coil 80. The outer or right end of core 78 is provided with an adjustable pole piece 82 in the form of a screw which can be set to the proper lateral position relative to the band section 50 for the desired amount of bowing of the band. The forward end of this adjustable pole piece is cushioned by a plastic pad 83, of nylon for example, to minimize wear and to provide an air gap for the magnetic flux to and from the bowing arm 58. The outer or right end of the bowing arm carries a circular pole piece which has a peripheral groove 85 into which the band section 50 can fit.

The lower ends of each of the clamping bars 54 and 56, and of bowing arm 58, are hinged to support plate 66 so that their top ends are swingable laterally toward and away from a respective one of pole pieces 70, 74 and 82. As seen in FIGURE 4, clamping bar 54 is hinged to support plate 66 by a thin flat flexure 86 the lower end of which is bolted to support plate 66 and which along its upper portion is brazed to the inner face of clamping bar 54. Clamping bar 56 is hinged in the same way by a flexure (not shown). Similarly, as seen in FIGURE 3, the lower end of the bowing arm 58 is joined by a flexure 88 to support plate 66. Each of these hinge flexures is of soft magnetic material.

To illustrate as clearly as possible the several magnetic flux paths in motor 26, there is shown in FIGURE 5 a partly schematic perspective view of the motor taken from its side opposite to that seen in FIGURE 1. For the reason which will be explained shortly, the permanent magnets of the clamping bars 54 and 56 have their like poles extending in the same directions. In FIGURE 5, the movable ends of these bars are shown as north (N) poles and their hinged ends adjacent support plate 66 are south (S) poles. Bowing arm 58, by virtue of its proximity to clamping bars 54 and 56 is north magnetic at its movable end. Accordingly, each of these magnetized members establishes lines of magnetic flux, as indicated by the three solid arrows 90, 92 and 94 respectively, which extend across from the movable or upper ends of bars 54 and 56 and arm 58 to the corresponding pole pieces 70, 74 and 82 of the three electromagnets, downward through the cores, and then within plate 66 back to the lower ends of the clamping bars and upward.

When no current is flowing in the coils of the electromagnets, the clamping bars and bowing arm, because of the permanent magnetic flux, will be drawn against band section 50 and thus hold it against the stationary pole pieces of the electromagnets. On the other hand, when an alternating current is applied to any one of the electromagnets there is generated an alternating magnetic flux, represented in the three electromagnets by the dotted arrows 96, 98 and 100, respectively, and the opposing clamping bar or bowing arm will cyclicly be repelled from the electromagnet thus releasing its pressure against band section 50. By operating the clamping and releasing actions of the clamping bars 54 and 56 and bowing arm 58 in proper phases relative to each other, band section 50 can be inched along to either the right or the left.

As can be seen in FIGURE 5, the turns of coils 71 and 75 are wound in the same sense on their respective cores. However, these coils are connected in reverse sense to the supply terminals 102 and 104. Thus, the lower end of coil 71 and the upper end of coil 75 are both connected to terminal 102. The center electromagnet coil 80 is independently connected to the terminals 106 and 108.

To energize the three electromagnets, terminals 102 and 104 can be connected to a 110 volt, 60 cycle power source for example, and terminals 106 and 108 connected to a control apparatus (not shown) which, in accordance with the direction in which the band is to be driven, supplies a similar voltage either in phase or out of phase with the source voltage. The alternating magnetic flux induced in the cores of the two electromagnets 60 and 62 causes clamping bars 54 and 56 to be attracted and repelled alternately, 180° out of phase with each other, toward and away from the opposing pole pieces 70 and 74. Assuming that current is applied to the center coil 80 in phase with the current to coil 75, then bowing arm 58 will move toward and away from pole piece 82 in phase with the movement of clamping bar 56.

FIGURE 6(a) indicates by the sinusoidal curve 120 the magnetic flux generated in the right-hand core 68 by current in coil 71. Superimposed on this curve is a dotted line 122 which indicates the steady magnetic flux induced in the core by the permanent magnetism of clamping bar 54. When the alternating flux line 120 exceeds the level of line 122, pole piece 70 becomes in effect a north pole and thereupon repels the upper end of clamping bar 54. On the other hand, when alternating line 120 lies below line 122, pole piece 70 is attracted to clamping bar 54 and section 50 of endless band 34 is clamped between them. By providing a steady flux, the alternating flux is biased so that clamping bar 54 is repelled from pole piece 70 once each cycle.

The magnetic flux in core 72 is illustrated in FIGURE 6(b), line 124 indicating the alternating flux and line 126 indicating the steady flux induced by the permanent magnetism of clamping bar 56. It will be noted that alternating line 124 is 180° out of phase with alternating line 120 in FIGURE 6(a). Finally, FIGURE 6(c) illustrates the flux in core 78, solid line 128 indicating the alternating flux when coil 80 is energized in phase with coil 75, and dotted line 130 indicating the alternating flux when coil 80 is energized in phase with coil 71. The straight, horizontal dotted line 132 indicates the steady magnetic flux passing from bowing arm 58 to core 78.

FIGURES 7, 8 and 9 illustrate the sequential operation of the clamping bars and bowing arm as they act in inching band section 50 to the left. To give such leftward movement of the band, coils 75 and 80 are connected in phase so that the alternating fluxes induced in pole pieces 74 and 82 are in phase as represented by solid line 124 in FIGURE 6(b) and by solid line 128 in FIGURE 6(c). At the instant of time represented by section lines 7—7 in FIGURE 6, clamping bars 54 and 56 and bowing arm 58 will occupy the positions shown in FIGURE 7. (The clamping bar 54 is shown a substantial distance away from the band section 50 only for explanatory purposes; actually the distance of separation normally will be only a few thousandths of an inch.) At this instant the alternating flux in pole piece 70 is inducing a north (N) pole which repels clamping bar 54 while the fluxes in pole piece 74 and pole piece 82 are inducing south (S) poles which attract clamping bar 56 and bowing arm 58, respectively. In this position, band section 50 is bowed, its right end having been drawn to the left by the small amount required in bowing it. A quarter-cycle later, indicated by lines 8—8 in FIGURE 6, the parts occupy the position shown in FIGURE 8. Now, band section is held by both clamping bars 56 and 54, the permanent magnetism of the latter two pulling them against pole pieces 70 and 74 which at this instant are not magnetized by alternating flux. Another quarter cycle later, indicated by lines 9—9 in FIGURE 6, and as shown in FIGURE 9, clamping bar 56 and the bowing arm will have moved away from pole pieces 74, 82 which have become in effect north poles, and the left-hand end of band section 50 will have moved incrementally to the left under the tension of spring 48 and of the straightening force of the band itself, the right-hand end of the band section being held stationary between clamping bar 54 and pole piece 70.

The mode of operation continues until section 50 of band 34 reaches the position desired whereupon the current to coil 80 is turned off and the motor stops. It is not necessary to de-energize coils 71 and 75 since they merely actuate the clamping bars, no motion being imparted to the band unless coil 80 is energized. To reverse the direction of travel of the band, coil 80 is energized in phase with coil 71.

The above description of the invention is intended in illustration and not in limitation thereof. Various changes may occur to those skilled in the art and these may be made without departing from the spirit or scope of the invention as set forth.

I claim:

1. A motor for positioning instruments and the like, said motor comprising a frame, a pair of spaced apart pulleys supported from said frame, a thin metal ribbon stretched around said pulleys and having a tension spring pulling its two ends together to form an endless band, first, second and third electromagnets spaced along one portion of said ribbon generally midway between said pulleys, each electromagnet having an upstanding core fixed to a magnetic portion of said frame and having a coil surrounding said core, the outer ends of said cores having pole pieces laterally extending toward said ribbon, the pole pieces of the first and third electromagnets being closer to said ribbon than the pole piece of said second electromagnet, first, second and third upstanding magnetic members hinged to said frame and extending generally parallel to said electromagnets, the outer ends of said members being opposite respective ones of said pole pieces on the opposite side of said ribbon, and means to energize with alternating current said first and third electromagnets out of phase to each other and to energize with alternating current said second electromagnet selective in phase with either said first or third electromagnet.

2. The motor as in claim 1 wherein said first and third members are permanently magnetized, and wherein the pole piece of said second electromagnet is laterally adjustable.

3. A positioning motor for precise control of instruments and the like, said motor comprising a generally straight strip of relatively un-stretchable but laterally deflectable material, two clamping electromagnets and a deflecting electromagnet therebetween mounted on a magnetic base plate with their ends spaced apart along one side of said strip and with said clamping electromagnets closely adjacent said strip and said deflecting electromagnet slightly away from said strip, three movable members of magnetic material on the other side of said strip, each member being opposite a respective one of said electromagnets and laterally movable against and away from said strip, and means to energize said clamping electromagnets out of phase with each other and to energize said deflecting electromagnet selectively in phase with either one of said clamping electromagnets to drive said strip in either direction.

4. A motor for precisely positioning instrument pointers and the like, said motor comprising a frame, a pair of support means mounted on said frame, a thin generally unstretchable strip supported by said support means and movable in either direction, spring means tensioning said strip, first, second and third laterally movable members spaced along one portion of said strip generally midway between said support means, each member having an end piece laterally extending toward said strip, first and second clamping elements fixed to said frame and being positioned opposite respective ones of said first and third members on the opposite side of said strip, and means to energize with alternating movement said first and third movable members out of phase to each other and to energize with alternating movement said second movable member selective in phase with either said first or third movable member to drive said strip in either direction.

References Cited in the file of this patent

UNITED STATES PATENTS

| | | |
|---|---|---|
| 1,396,337 | McDonald | Nov. 8, 1921 |
| 1,941,597 | Cavagnaro | Jan. 2, 1934 |
| 2,646,518 | Thompson | July 21, 1953 |